United States Patent
Hung et al.

(10) Patent No.: US 11,078,315 B2
(45) Date of Patent: Aug. 3, 2021

(54) COPOLYMERS OF PERFLUOROTRIVINYLTRIAZINE COMPOUNDS AND METHODS FOR SYNTHESIZING THE COPOLYMERS

(71) Applicant: E. I. DU PONT DE NEMOURS AND COMPANY, Wilmington, DE (US)

(72) Inventors: Ming-Hong Hung, Wilmington, DE (US); Phan Linh Tang, West Chester, PA (US); Donald F. Lyons, Wilmington, DE (US); Xudong Chen, Hockessin, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 16/066,535

(22) PCT Filed: Dec. 20, 2016

(86) PCT No.: PCT/US2016/067733
§ 371 (c)(1),
(2) Date: Jun. 27, 2018

(87) PCT Pub. No.: WO2017/116842
PCT Pub. Date: Jul. 6, 2017

(65) Prior Publication Data
US 2019/0016836 A1    Jan. 17, 2019

Related U.S. Application Data

(60) Provisional application No. 62/272,722, filed on Dec. 30, 2015.

(51) Int. Cl.
| | | |
|---|---|---|
| *C08F 226/06* | (2006.01) | |
| *C08F 214/26* | (2006.01) | |
| *C08F 214/22* | (2006.01) | |
| *C08F 214/28* | (2006.01) | |

(52) U.S. Cl.
CPC ...... *C08F 214/262* (2013.01); *C08F 214/222* (2013.01); *C08F 214/282* (2013.01); *C08F 226/06* (2013.01)

(58) Field of Classification Search
CPC .................................................. C08F 214/262
See application file for complete search history.

(56) References Cited

U.S. PATENT DOCUMENTS

| | | | |
|---|---|---|---|
| 4,211,868 A * | 7/1980 | Erdman | C07C 17/275 544/221 |
| 4,743,658 A | 5/1988 | Imbalzano et al. | |
| 5,026,803 A | 6/1991 | Lindner et al. | |
| 5,247,036 A * | 9/1993 | Kruger | C08F 214/186 526/247 |
| 5,565,512 A | 10/1996 | Saito et al. | |
| 5,587,424 A * | 12/1996 | Langstein | C08L 27/12 525/416 |
| 6,281,296 B1 | 8/2001 | MacLachlan et al. | |
| 6,552,093 B1 | 4/2003 | Curtin et al. | |
| 7,166,685 B2 | 1/2007 | Curtin et al. | |
| 7,960,480 B2 | 6/2011 | Lyons et al. | |
| 7,999,049 B2 | 8/2011 | Coughlin et al. | |
| 2010/0248324 A1 | 9/2010 | Xu et al. | |

FOREIGN PATENT DOCUMENTS

| | | |
|---|---|---|
| JP | 03-045611 A | 2/1991 |
| JP | 05-339247 A | 12/1993 |
| JP | H06-136218 * | 5/1994 |
| JP | 06-248026 A | 9/1994 |
| JP | 2012-521480 A | 9/2012 |
| WO | 00/09603 A1 | 2/2000 |
| WO | 2010/110851 A2 | 9/2010 |

OTHER PUBLICATIONS

Translation of JP H06-136218 (1994) (Year: 1994).*
Annex to the communication dated Apr. 9, 2019 for EP Application No. 16831674.
International Search Report and Written Opinion issued in International Application No. PCT/US2016/067733, dated Apr. 19, 2017.
Watakabe A et al, "Perfluorinated Thermosetting Resins", ACS National Meeting, 1999, vol. 40(2), pp. 575-576.

* cited by examiner

*Primary Examiner* — Robert C Boyle
(74) *Attorney, Agent, or Firm* — Maria M. Kourtakis

(57) ABSTRACT

Provided herein are copolymers that comprise copolymerized residues of a perfluorotrivinyltriazine monomer of Formula 1.

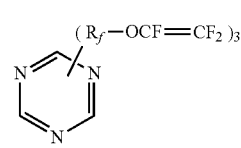

(1)

Preferred $R_f$ groups include, without limitation, $-(CF_2)_n-$ (n=1-6); $-(CF_2)_m-[OCF(CF_3)CF_2]_p-$ (m=1-4, p=1-4); and $-[(CF(CF_3)-O)_x-(CF_2)_k]-$ (x=1-3, k=1-5). Preferred comonomers for copolymerization with the perfluorotrivinyltriazine monomer (1) include, without limitation, tetrafluoroethylene (TFE); vinylidene fluoride (VF2); hexafluoropropylene (HFP); vinyl fluoride (VF); EVE; PSEPVE; perfluoro-(long chain vinyl ethers); E; P; PFBE; PEVE; EVE-OH; EVE-P; PDD; and the cure-site monomers BTFB, ITFB, 8-CNVE, 8-SAVE, and the like. Also provided are methods of synthesizing the copolymers and articles comprising the copolymers.

18 Claims, No Drawings

COPOLYMERS OF PERFLUOROTRIVINYLTRIAZINE COMPOUNDS AND METHODS FOR SYNTHESIZING THE COPOLYMERS

CROSS REFERENCES TO RELATED APPLICATIONS

The present application claims priority under 35 U.S.C. § 371 as a national stage application of Intl. Appln. No. PCT/US2016/067733, filed on Dec. 20, 2016, which in turn claims priority under 35 U.S.C. § 119 to U.S. Provisional Application No. 62/272,722, filed on Dec. 30, 2015, each of which is incorporated herein by reference in its entirety.

FIELD OF THE INVENTION

Provided herein are copolymers that include copolymerized residues of a perfluorotrivinyltriazine monomer of Formula 1.

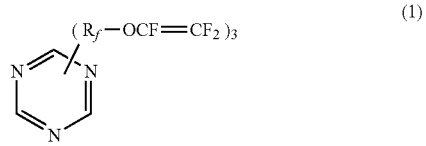

Preferred $R_f$ groups include, without limitation, —$(CF_2)_n$— (n=1-6); —$(CF_2)_m$—[OCF(CF$_3$)CF$_2$]$_p$— (m=1-4, p=1-4); and and —[(CF(CF$_3$)—O)$_x$—(CF$_2$)$_k$]— (x=1-3, k=1-5). Preferred comonomers for copolymerization with the perfluorotrivinyltriazine monomer (1) include, without limitation, TFE, HFP, perfluoro(alkyl vinyl ethers), VF2, VF (vinyl fluoride), EVE, PSEPVE, perfluoro-(long chain vinyl ethers), E, P, PFBE, PEVE, EVE-OH, EVE-P, PDD (AF-monomer), etc.), and cure-site monomers (such as BTFB, ITFB, 8-CNVE, 8-SAVE, etc. Perfluorinated comonomers are more preferred. The copolymer may optionally also contain chain transfer agents such as perfluoroalkyl diiodides, I—(CF$_2$)$_n$—I (n=3 to 10). Also provided are methods of synthesizing the copolymers and articles comprising the copolymers.

BACKGROUND OF THE INVENTION

Several patents and publications are cited in this description in order to more fully describe the state of the art to which this invention pertains. The entire disclosure of each of these patents and publications is incorporated by reference herein.

Elastomer compounds that comprise a cured fluoroelastomer compound have achieved commercial success because they provide a useful service life in severe environments, including in particular exposure to elevated heat and to aggressive chemicals. For example, these compounds are used in seals in aircraft engines, in oil-well drilling devices, and in other industrial equipment that operates at high temperatures and in a variety of atmospheres.

The properties of cured fluoroelastomer compounds arise largely because of the stability and inertness of the copolymerized residues of the comonomers that make up the major portion of the polymeric backbone of these compounds. Such comonomers include fluorinated or perfluorinated compounds, such as tetrafluoroethylene and perfluoro(alkyl vinyl ethers), for example. In addition, in order to develop their elastomeric properties fully, the fluoroelastomer compounds are generally crosslinked, i.e., vulcanized or cured. To this end, a cure site comonomer is usually incorporated by copolymerization into the fluoroelastomer backbone. In a second process, separate from the copolymerization, the cure site comonomer is reacted with a curing agent to form the crosslinked fluoroelastomer compound. The crosslinked fluoroelastomer compound may be produced in the form of the desired end-use article, for example a gasket or an O-ring, using a crosslinking process that involves compressing the fluoroelastomer compound into an appropriate mold before curing it to form the article.

Several cure site comonomers for fluoroelastomer compounds are known in the art. For example, cure site comonomers containing at least one nitrile group, such as perfluoro-8-cyano-5-methyl-3,6-dioxa-1-octene, are described in U.S. Pat. No. 7,999,049, issued to Coughlin et al. Curing agents for fluoroelastomer compounds that include a cure site monomer with a nitrile group are described in U.S. Pat. No. 5,565,512, issued to Saito et al., and in U.S. Pat. No. 6,281,296, issued to MacLachlan et al., for example. In the curing process, nitrile groups are reacted with the curing agents to form linkages between them, for example three nitrile groups reacting to form a triazine linkage, as described by Maclachlan et al. (Id.). Preferably, before curing the linked nitrile groups are pendant from different fluoroelastomer molecules.

Nevertheless, crosslinked fluoroelastomer compounds produced by reacting cure site comonomers are subject to excessive crosslinking, which manifests as the formation of "gel" or unprocessible polymer. The excessive crosslinking is attributable both to the overinclusion of copolymerized residues of cure site comonomer in the fluoroelastomer backbone and to the presence of an excess of curing agent in the crosslinking reaction mixture.

It remains desirable, therefore, to produce a cross-linked fluoroelastomer compound with fully developed elastomeric properties via a more efficient process that does not require a separate curing step. It also remains desirable to produce a cross-linked fluoroelastomer compound in which the level of crosslinking is lower and more easily controllable, so that inefficient "gel" formed by excessive crosslinking can be reduced or eliminated.

SUMMARY OF THE INVENTION

Provided herein is a copolymer comprising copolymerized residues of a perfluorotrivinyltriazine monomer of formula (1):

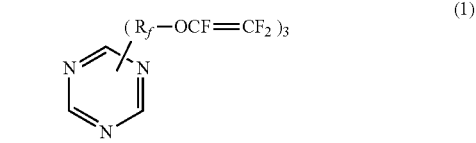

wherein the three $R_f$ groups are the same or different, and wherein the three $R_f$ groups are selected from the group consisting of —$(CF_2)_n$— (n=1-6); —$(CF_2)_m$—[OCF(CF$_3$)CF$_2$]$_p$— (m=1-4, p=1-4); and —[(CF(CF$_3$)—O)$_x$—(CF$_2$)$_k$]— (x=1-3, k=1-5).

Further provided is a process for producing a cross-linked fluoroelastomer. The process comprises the steps of:
 a. providing a perfluorotrivinyltriazine monomer of formula (1):

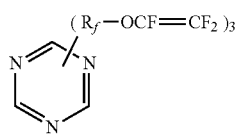

wherein the three $R_f$ groups are the same or different, and wherein the three $R_f$ groups are selected from the group consisting of —$(CF_2)_n$— (n=1-6); —$(CF_2)_m$—[$OCF(CF_3)CF_2$]$_p$— (m=1-4, p=1-4); and —[$(CF(CF_3)$—$O)_x$—$(CF_2)_k$]— (x=1-3, k=1-5);

b. providing one or more comonomers; and
c. reacting the perfluorotrivinyltriazine monomer of formula (1) with one or more other comonomers to obtain the cross-linked fluoroelastomer.

DETAILED DESCRIPTION

Unless otherwise defined, all technical and scientific terms used herein have the same meaning as commonly understood by one of ordinary skill in the art to which this invention belongs. Although methods and materials similar or equivalent to those described herein can be used in the practice or testing of the present embodiments, suitable methods and materials are described below. The materials, methods, and Examples described herein are illustrative only and not intended to be limiting. Unless otherwise defined, numerical ranges include both endpoints and all values between the endpoints.

As used herein, the terms "includes," "including," "has," "having," "contains," "containing" or any other variation thereof, refer to a non-exclusive inclusion. For example, a process, method, article, or apparatus that includes a list of elements is not necessarily limited to those elements, but may include other elements not expressly listed or inherent to such process, method, article, or apparatus.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format." Where an invention or a portion thereof is described with an open-ended term such as "comprising," it is to be understood that, unless otherwise stated in specific circumstances, this description also includes a description of the invention using the terms "consisting of" and "consisting essentially of".

Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

Also, use of "a" or "an" are employed to describe elements and components of the invention. This is done merely for convenience and to give a general sense of the invention. This description should be read to include one or at least one and the singular also includes the plural unless it is obvious that it is meant otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise in limited circumstances. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Moreover, where a range of numerical values is recited herein, unless otherwise stated in specific circumstances, the range is intended to include the endpoints thereof, and all integers and fractions within the range. It is not intended that the scope of the invention be limited to the specific values recited when defining a range. Finally, when the term "about" is used in describing a value or an end-point of a range, the disclosure should be understood to include the specific value or end-point referred to.

As used herein, the term "finite amount" refers to an amount that is greater than zero.

Finally, as used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

Provided herein are copolymers comprising copolymerized residues of a perfluorotrivinyltriazine monomer of Formula 1.

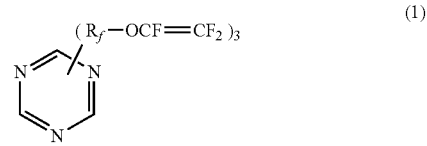

The three $R_f$ groups may be the same or different, and the perfluorotrivinyltriazine monomer (1) may include one, two, or three distinct $R_f$ groups. Preferably, however, the three $R_f$ groups are the same.

Suitable $R_f$ groups include, without limitation, perfluoroalkyl groups and perfluoroalkoxy groups, both of which include from 1 to 20 carbon atoms. Preferred $R_f$ groups include, without limitation, —$(CF_2)_n$—, wherein 1≤n≤6;

—$(CF_2)_m$—$[OCF(CF_3)CF_2]_p$—, wherein $1 \leq p \leq 4$; and —$[(CF(CF_3)$—$O)_x$—$(CF_2)_k]$—, wherein $1 \leq x \leq 3$ and $1 \leq k \leq 5$. More preferred $R_f$ groups include, without limitation, —$(CF_2)_n$—, wherein $2 \leq n \leq 5$; —$(CF_2)_m$—$[OCF(CF_3)CF_2]_p$—, wherein $1 \leq m \leq 2$ and $1 \leq p \leq 2$; and —$[CF(CF_3)$—$O$—$(CF_2)_k]$—, wherein $2 \leq k \leq 4$.

The perfluorotrivinyltriazine monomer (1) may be synthesized by any suitable method, for example by the methods described by Watakabe et al. in "Perfluorinated Thermosetting Resins," Polymer Preprints (American Chemical Society, Division of Polymer Chemistry) (1999), 40(2), 575-576. Briefly, perfluorinated molecules that include a vinyl group and a nitrile group are trimerized, preferably in the presence of an inorganic oxide catalyst, to form the perfluorotrivinyltriazine monomer (1).

The copolymers described herein include copolymerized residues of one or more other comonomers in addition to those of perfluorotrivinyltriazine monomer (1). Suitable comonomers include, without limitation, tetrafluoroethylene (TFE); vinylidene fluoride (VF2); hexafluoropropylene (HFP); vinyl fluoride (VF); propanoic acid, 3-[1[difluoro[(trifluoroethenyl)oxy]methyl]-1,2,2,2-tetrafluoroethoxy]-2,2,3,3-tetrafluoro-, methyl ester (EVE, CAS No. [63863-43-4]); perfluoro-2-(2-fluorosulfonylethoxy) propyl vinyl ether (PSEPVE, CAS No. [16090-14-5]); perfluoro-(long chain vinyl ethers); ethylene (E); propylene (P); perfluorobutyl ethylene (PFBE); perfluoro(methyl vinyl ether) (PMVE); perfluoro(ethyl vinyl ether) (PEVE); perfluoro(propyl vinyl ether) (PPVE); 9,9-dihydro-9-hydroxyperfluoro(3,6-dioxa-5-methyl-1-nonene (EVE-OH, CAS No. [133573-37-2]); 1-propanol, 3-[1[difluoro[trifluoroethenyl) oxy]methyl]-1,2,2,2-tetrafluoroethoxy]-2,2,3,3-tetrafluoro-, dihydrogen phosphate (EVE-P); 1,3-dioxole, 4,5-difluoro-2,2-bis(trifluoromethyl) (PDD or "AF-monomer," CAS No. [37697-64-6]); and 2-(difluoromethylene)-4,4,5-trifluoro-5-(trifluoromethyl)-1,3-dioxolane (PMD, CAS No. [17256-52-9]), etc.; chain transfer agents such as perfluoroalkyl diiodides, including I—$(CF_2)_n$—I (n=3 to 10); and cure-site monomers, such as the following:

BTFB-Bromotetrafluoro-1-butene, Br—(CF2)2-CH=CH2

ITFB-Iodotetrafluoro-1-butene, I—$(CF_2)_2$—CH=$CH_2$

8-CNVE-3-(1-[Difluoro((trifluoroethenyl)oxy)methyl)-1,2,2,2,-tetrafluoroethoxy)-2,2,3,3,-tetrafluoropropane nitrile, CAS No. [69804-19-9]

8-SAVE-1,1,2,2-tetrafluoro-2-((1,1,1,2,3,3-hexafluoro-3-((1,2,2-trifluorovinyl)oxy)propan-2-yl)oxy)ethane-1-sulfonyl azide Preferred comonomers include, without limitation, TFE, HFP, PMVE, PPVE, and VF2.

The copolymers may include copolymerized residues of any number of suitable comonomers. Dipolymers and terpolymers are preferred. Dipolymers include copolymerized residues of the perfluoro triazine monomer (1) and copolymerized residues of one other comonomer. Preferred dipolymers include copolymerized residues of the comonomers listed immediately above as preferred comonomers, and more preferred dipolymers include copolymerized residues of the comonomers listed immediately above as more preferred comonomers. Terpolymers include copolymerized residues of the perfluoro triazine monomer (1) and copolymerized residues of two other comonomers. Preferred terpolymers include copolymerized residues of a combination of two of the comonomers listed immediately above as preferred comonomers, and more preferred terpolymers include copolymerized residues of one or two of the comonomers listed immediately above as more preferred comonomers.

The copolymers include any amount of copolymerized residues of the perfluorotrivinyltriazine monomer (1) that does not result in an intractable material, that is, a material that cannot undergo the further processing steps that are necessary to achieve its desired end use. Preferably, the copolymer includes from about 0.5 wt % to about 25 wt % of copolymerized residues of perfluorotrivinyltriazine monomer (1); or from about 1 wt % to about 10 wt %, or about 1 wt % to about 5 wt %, based on the total weight of the copolymer. When the copolymerized residues of the perfluorotrivinyltriazine monomer (1) are present at these levels, the copolymers are substantially free of "gel" or unprocessible polymer that results from excessive crosslinking.

Complementarily, the copolymer includes copolymerized residues of one or more comonomers. Preferably, the copolymer includes from about 99.5 wt % to about 75 wt % of copolymerized residues of one or more comonomer; or from about 99 to about 90 wt %; or from about 99 to about 95 wt %. The weight percentages of the copolymerized repeat units of the one or more comonomers are also based on the total weight of the comonomer. The term "complementary," as used herein in the context of the empirical formulae of copolymers, refers to weight percentages whose sum is 100 wt %. Stated alternatively, the sum of the weight percentages of the copolymerized residues in the copolymers described herein is 100 wt %.

Some preferred copolymers are dipolymers including copolymerized residues of the perfluorotrivinyltriazine monomer (1) with TFE or with VF2. Some preferred copolymers are terpolymers including copolymerized residues of the perfluorotrivinyltriazine monomer (1) with TFE and HFP; with TFE and VF2; or with TFE and PPVE. More preferably, the copolymer includes copolymerized residues of the perfluorotrivinyltriazine monomer (1) with TFE and PMVE; or with TFE, VF2 and PMVE.

The copolymers may be synthesized by methods described in the prior art as suitable for the synthesis of fluorinated polymers, for example those described in U.S. Pat. Nos. 7,999,049; 5,565,512; and 6,281,296, cited above, and in U.S. Pat. No. 7,960,480, issued to Lyons et al. Preferably, however, the synthesis is a continuous, semi-batch or batch emulsion polymerization. Solution polymerization methods are also suitable.

Those of skill in the art are aware that the perfluorotrivinyltriazine monomer (1) may yield a number of structures when copolymerized. In particular, three, two or one of the perfluorovinyl groups may be incorporated by copolymerization into the backbone of one or more copolymer molecules. Thus, the copolymers described herein are expected to include unreacted perfluorovinyl groups, in an amount up to 200 mol %, based on the total number number of moles of copolymerized residues of perfluorotrivinyltriazine monomer (1). Preferably, however, the amount of unreacted perfluorovinyl groups is significantly less than 200 mol %, because the presence of 200 mol % of unreacted perfluorovinyl groups indicates that the copolymer remains substantially uncrosslinked by the copolymerized residues of the perfluorotrivinyltriazine monomer (1). Accordingly, the amount of unreacted perfluorovinyl groups in the copolymer is preferably a finite amount up to 200 mol %, or 1 mol % to 199 mol %, or 100 mol % to 150 mol %.

Those of skill in the art are also aware that significant levels of unreacted perfluorovinyl groups in the copolymer may be detected using conventional analytical means. For example, the three perfluorovinyl fluorine atoms may be detected in $^{19}$F-NMR spectroscopy. Three multiplets of peaks at a chemical shift of approximately −110 to −115 ppm, −120 to −125 ppm, and −133 to −138 ppm and a doublet of peaks at a chemical shift of approximately −144 ppm are expected to be observed. The triplet peaks and the doublet peaks are expected to have relative integrals of 1 and 2, respectively. The absolute value of the integrals depends on the amount of copolymerized perfluorotrivinyltriazine monomer (1) in the copolymer and on the extent of its reaction, as described above.

In addition, the triazine ring and the C=C double bond in the unreacted perfluorovinyl groups may be detected by IR spectroscopy. An absorption band at approximately 1835 cm$^{-1}$ due to vibration of the C=C double bond and an absorption band at approximately 1550 cm$^{-1}$ due to vibration of the triazine ring are expected to be observed. Again, the intensity of the absorption bands depends on the amount of copolymerized perfluorotrivinyltriazine monomer (1) in the copolymer and on the extent of its reaction, as described above.

Finally, the copolymers described herein are not expected to include a detectable quantity of nitrile groups, provided that no nitrile groups are introduced via optional cure site comonomers.

In contrast, triazine rings are formed as part of a cross-linking mechanism in some known perfluoroelastomers. For example, McLachlan et al., in U.S. Pat. No. 6,281,296, describe perfluorinated "cure site monomers" of the formula CF$_2$=CF—O—R$_{fa}$—C≡N, wherein R$_{fa}$ is substantially similar to R$_f$, as defined above. In these known perfluoroelastomers, however, the perfluorovinyl groups are incorporated into the fluoroelastomer backbone by copolymerization. Unreacted or "free" comonomer is removed from the fluoroelastomer by purification. In the curing reaction, three pendant nitrile groups react to form the triazine ring. Thus, in the known nitrile-containing fluoroelastomers that are cross-linked by forming a triazine ring, an incomplete cross-linking reaction yields unreacted nitrile groups, not unreacted perfluorovinyl groups. Accordingly, analysis of these known nitrile-containing fluoroelastomers, after curing, will show absorption in the IR spectrum consistent with the presence of triazine ring and also possibly an absorption band at approximately 2240 cm$^{-1}$ due to vibration of the C≡N triple bond in unreacted nitrile groups. Moreover, analysis by $^{19}$F-NMR spectroscopy will not show evidence of any significant quantity of unreacted perfluorovinyl groups.

When copolymerized residues of an optional cure site comonomer are included in the copolymer, fluoroelastomer compounds may be prepared by mixing the copolymer, one or more curing agents, and optional components until homogeneous using rubber compounding procedures such as a two roll rubber mill, an internal mixer, for example, a Banbury internal mixer, or in an extruder.

Suitable curing agents include, without limitation, any curing agent described in the art as suitable for use with the optional cure site comonomer(s) copolymerized in the copolymer.

Suitable optional components for addition to the fluoroelastomer compounds include, without limitation, any additives and optional components described in U.S. application Ser. Nos. 14/866,890; 14/804,375; and 14/866,902.

The fluoroelastomer compounds may be cured by the application of heat and/or of pressure sufficient to cause the curing agent(s) to form crosslinks with cure site monomer(s). Alternatively, a dual cure system may also be used. When the curing method is compression molding, a press cure cycle is preferably followed by a post cure cycle in which the press cured compound is heated at elevated temperatures in excess of 300° C. for several hours.

The copolymers described herein may be employed in articles designed for use in severe environments, for example seals, gaskets and O-rings for use at high temperatures or under exposure to aggressive solvents or corrosive chemicals. One preferred type of article is seals for use in high-temperature automotive applications.

In addition, the copolymers described herein may be useful as modifiers or compounding additives for other fluoropolymers or fluoroelastomers. For example, due to steric effects, it is believed that the copolymers will be more efficient, compared to the fluoropolymers or fluoroelastomers that do not include copolymerized residues of the perfluorotrivinyltriazine monomer (1), in disturbing the fluoropolymer's or fluoroelastomer's crystallinity, hence enhancing their processability.

In addition, the copolymer is useful as an emulsion blend component. For example, an aqueous dispersion or emulsion of the copolymer may be blended with a dispersion of another polymer. The mixture of latex particles is subsequently isolated. The presence of the copolymer effects a change in the bulk rheology of the other polymer, so that the green strength, slump resistance, tensile strength, elongational viscosity (i.e., ease of extrusion), and die swell behavior of the blend are different from those of the other polymer.

The following examples are provided to describe the invention in further detail. These examples, which set forth specific embodiments and a preferred mode presently contemplated for carrying out the invention, are intended to illustrate and not to limit the invention.

EXAMPLES

Materials

The term "ester vinyl ether" (abbreviated "EVE") as used herein refers to methyl perfluoro(4,7-dioxa-5-methyl-8-nonenoate) [chemical formula CF$_2$=CF—O—CF$_2$CF(CF$_3$)—O—CF$_2$CF$_2$—C(O)OCH$_3$], a material that is commercially available from DuPont.

Capstone™ FS-10 fluorinated surfactant is available commercially from The Chemours Company of Wilmington, Del.

The perfluoroionomer dispersion was prepared according to the methods described in U.S. Pat. No. 6,552,093, and had a solids content of 20 wt %.

Alternatively, an aqueous dispersion of perfluorinated ionomer particulate was prepared according to the procedure described in Example 4 of U.S. Pat. No. 7,166,685, issued to Curtin et al. (fluorinated ionomer in the acid form) using TFE/PDMOF fluorinated ionomer resin having an IXR of 12.1 (EW of 950) and a melt flow in its sulfonyl fluoride form of 24. The aqueous dispersion of fluorinated ionomer particulate had a solids content of about 20 wt % with the fluorinated ionomer particulate having a weight average diameter of 8 nm. The ionic groups had a pKa of about 1.9 as measured on the fluorinated ionomer in aqueous dispersion form having 10 wt % solids at room temperature.

Methods

Nuclear magnetic resonance (NMR) spectra were obtained using a Varian spectrophotometer operated at a frequency of 475 MHz. The polymer samples were dissolved in acetone-d$_6$.

Thermogravimetric analysis (TGA) data and differential scanning calorimetry (DSC) data were obtained using a thermal analyzer available from TA Instruments of New Castle, Del. Measurements were conducted under a nitrogen atmosphere. For TGA measurements, the sample's temperature was increased at a rate of 10° C./min to a final temperature of 550° C. For DSC measurements of fluoroelastomers, the sample's temperature was increased at a rate of 10° C./min to a final temperature of 200° C. The sample was quenched to a temperature of −60° C. by exposure to liquid nitrogen. From this temperature, the temperature of the sample was once more increased to a final temperature of 200° C. at a rate of 10° C./min.

Preparative Example 1

Preparation of 8-CNVE Cyclic Trimer (Monomer A)

A reaction flask was charged with 2,2,3,3-tetrafluoro-3-[1,1,1,2,3,3-hexafluoro-3-(1,2,2-trifluorovinyloxy)propan-2-yloxy]propanenitrile ("8-CNVE", 280 grams, 0.72 moles) and silver oxide catalyst (2.0 grams). The reaction mixture was stirred at 100° C. for 4 hrs. After cooling, the product mixture was filtered to remove catalyst residue. The filtrate was then purified by chromatography through a silica gel column using hexane/ethyl acetate as the eluent (20:1, v/v). The solvent was removed in vacuo, and the desired product was obtained as a light, viscous, clear liquid. Yield: 262 grams (93%). $^{19}$F-NMR: −79.6 (s, br, 9F), −81.5 (s, br, 6F), −84.4 (s, br, 6F), −118.0 (s, 6F), −113.5 (m, 3F), −121.7 (m, 3F), −136.2 (m, 3F), −143.8 (t, J=18.0 Hz, 3F); IR: 1550 cm$^{-1}$ (triazine), 1835 cm$^{-1}$ (—O—CF=CF2).

Example 2

Preparation of E/TFE/A Terpolymer

A one-liter Hastelloy C reactor was charged with 1,1,2-trichloro-1,2,2-trifluoroethane (350 mL), cyclohexane (5 grams), perfluorobutylethylene (PFBE, 3 mL), monomer A (1 gram), and di(4-tert-butylcyclohexyl) peroxy-dicarbonate (0.2 gram). The reactor was cooled to a temperature of −30 to −78° C. in a dry ice-acetone bath, and it was purged and flushed with nitrogen several times. The reactor was then cool-evacuated while remaining in the bath, and ethylene (20 grams) and tetrafluoroethylene (TFE, 80 grams) were transferred into the reactor. The reactor was sealed and heated at 50° C. for 8 hours. After cooling to room temperature under ambient conditions, the polymer inside the tube was unloaded and dried in a vacuum oven (150 mmHg, 100° C./24 hours). A white powdered polymer (79 grams) was obtained. This polymer has exhibited a Tm at 264.3° C. as measured by DSC, and it has a melt index of 0.175 g/min at 297° C./5 kg load.

Example 3

Preparation of TFE/EVE/A Terpolymer (Polymer AA)

A 400 mL Hastelloy C shaker tube was charged with 1,1,2-trichloro-1,2,2-trifluoroethane (130 grams), EVE monomer (52 grams), monomer A (2 grams), and di(4-tert-butylcyclohexyl) peroxydicarbonate (0.15 gram). The shaker tube was cooled to a temperature of −30 to −78° C. in a dry ice-acetone bath, and it was purged and flushed with nitrogen several times. The shaker tube was then cool-evacuated while remaining in the bath, and tetrafluoroethylene (TFE) was transferred into the reactor until the pressure reached 40 psig at 25° C. The reactor was sealed and heated at 50° C. for 2 hours while the TFE pressure was maintained at 60 psig. After cooling to room temperature under ambient conditions, the polymer inside the tube was unloaded and dried in a vacuum oven (150 mmHg, 100° C./24 hours). A white polymer (19 grams) was obtained. In a separate experiment, a TFE/EVE control di-polymer (Polymer BB) (without the co-monomer A) was made under the same polymerization conditions. The terpolymer exhibited stronger mechanical properties (tensile strength, modulus, and toughness) than the control di-polymer.

| | Strength at Yield (psi) | Strength at Max. (psi) | Strength at Break (psi) | Elongation at Yield (%) | Elongation at Max. (%) | Elongation at Break (%) | Modulus (kpsi) | Toughness (in-lb/in$^3$) |
|---|---|---|---|---|---|---|---|---|
| Polymer AA | 84.3 | 84.3 | 83.9 | 74.2 | 74.2 | 85.6 | 0.2776 | 42.3 |
| Polymer BB | 42.2 | 42.2 | 42.2 | 56.3 | 56.3 | 61.8 | 0.1079 | 12.4 |

Example 4

Preparation of TFE/EVE/A Terpolymer

A 400 mL Hastelloy C shaker tube was charged with 1,1,2-trichloro-1,2,2-trifluoroethane (55 grams), EVE monomer (51.6 grams), monomer A (1 gram), and di(4-tert-butylcyclohexyl) peroxydicarbonate (0.1 gram). The shaker tube was cooled to a temperature of −30 to −78° C. in a dry ice-acetone bath, and it was purged and flushed with nitrogen several times. The shaker tube was then cool-evacuated while remaining in the bath, and tetrafluoroethylene (TFE) was transferred into the reactor until the pressure reached 40 psig at 25° C. The reactor was sealed and heated at 45° C. for 6 hours while the TFE pressure was maintained at 60 psig. After cooling to room temperature under ambient conditions, the polymer inside the tube was unloaded and dried in a vacuum oven (150 mmHg, 100° C./24 hours). A white polymer (8 grams) was obtained. This polymer exhibited a glass transition temperature (Tg) at −11.9° C., as measured by DSC.

Example 5

Preparation of TFE/EVE/A Terpolymer

A 400 mL Hastelloy C shaker tube was charged with 1,1,2-trichloro-1,2,2-trifluoroethane (140 grams), EVE monomer (51.6 grams), monomer A (5 grams), and di(4-tert-butylcyclohexyl) peroxydicarbonate (0.15 gram). The shaker tube was cooled to a temperature of −30 to −78° C.

in a dry ice-acetone bath, and it was purged and flushed with nitrogen several times. The shaker tube was then cool-evacuated while remaining in the bath, and tetrafluoroethylene (TFE) was transferred into the reactor until the pressure reached 40 psig at 25° C. The reactor was sealed and heated at 45° C. for 6 hours while the TFE pressure was maintained at 60 psig. After cooling to room temperature under ambient conditions, the polymer inside the tube was unloaded and dried in a vacuum oven (150 mmHg, 100° C./24 hours). A white polymer (19 grams) was obtained. This polymer exhibited a glass transition temperature (Tg) at −13.8° C., as measured by DSC. Its composition was TFE/EVE/A=80.36/18.26/1.38 (mole %), as determined by $^{19}$F-NMR.

Example 6

Preparation of TFE/EVE/A Terpolymer

A 400 mL Hastelloy C shaker tube was charged with 1,1,2-trichloro-1,2,2-trifluoroethane (130 grams), EVE monomer (51.6 grams), monomer A (2 grams), and di(4-tert-butylcyclohexyl) peroxydicarbonate (0.15 gram). The shaker tube was cooled to a temperature of −30 to −78° C. in a dry ice-acetone bath, and it was purged and flushed with nitrogen several times. The shaker tube was then cool-evacuated while remaining in the bath, and tetrafluoroethylene (TFE) was transferred into the reactor until the pressure reached 40 psig at 25° C. The reactor was sealed and heated at 45° C. for 2 hours while the TFE pressure was maintained at 60 psig. After cooling to room temperature under ambient conditions, the polymer inside the tube was unloaded and dried in a vacuum oven (150 mmHg, 100° C./24 hours). A white polymer (14.5 grams) was obtained. This polymer has exhibited a glass transition temperature (Tg) at −14.2° C., as measured by DSC. Its composition was TFE/EVE/A=74.65/24.07/1.28 (mole %), as determined by $^{19}$F-NMR.

Example 7

Preparation of TFE/A Co-Polymer

A 400 mL Hastelloy C shaker tube was charged with 1,1,2-trichloro-1,2,2-trifluoroethane (150 grams), monomer A (1 grams), and di(4-tert-butylcyclohexyl) peroxydicarbonate (0.05 gram). The shaker tube was cooled to a temperature of −30 to −78° C. in a dry ice-acetone bath, and it was purged and flushed with nitrogen several times. The shaker tube was then cool-evacuated while remaining in the bath, and tetrafluoro-ethylene (TFE, 50 grams) was transferred into the reactor. The reactor was sealed and heated at 60° C./3 hours and 70° C./3 hours. After cooling to room temperature under ambient conditions, the polymer inside the tube was unloaded and dried in a vacuum oven (150 mmHg, 100° C./24 hours). A white polymer (41.5 grams) was obtained. This polymer exhibited a Tm at 322.4° C., as determined by DSC. This polymer is highly thermally stable as indicated by TGA, which showed an initial onset temperature at about 465° C.

Example 8

Preparation of TFE/PPVE/A Terpolymer

A one-liter stainless vertical reactor was charged with a mixture of distilled deionized water (400 mL), monomer A (2.0 g), and ammonium perfluorooctanoate (1.8 g). This mixture was freshly prepared by ultrasonication with a Dukane horn ultrasonicator (1.5 cm diameter; 10 min) and deoxygenating by bubbling nitrogen through a bubbler for 0.5 h. The reactor was purged with nitrogen and tetrafluoroethylene (TFE), followed by charging TFE (300 psig), perfluoro(propyl vinyl ether) (PPVE, 4.0 g) and ethane (12 psig). The reaction mixture was stirred at 600 rpm. The reactor was heated to 80° C. When at temperature, 1% ammonium persulfate solution (5.0 mL) was first pumped in at a rate of 5.0 mL/min to initiate reaction, then at a rate of 0.050 mL/min until about 50 g TFE was consumed (76 min). All feed was stopped and stirring was set at 200 rpm. The reactor was cooled to below 30° C. and stirring was set at 100 rpm. The reactor was vented and purged with nitrogen (3 times at 25 PSIg). Stirring was then stopped. The reactor was unloaded, and a polymer dispersion (486 g) was obtained. The polymer (11.61 g) was isolated by freezing, thawing, filtering, washing with deionized water for several times, and drying overnight in a vacuum oven at 60° C. under a vacuum of 30 mm Hg (4 kPa). A dry polymer powder (1.48 g) was obtained; thus, the solid content of the dispersion was 13 wt %. The 8-CNVE trimer content of the polymer solid was determined to be 0.5 weight % by FTIR method (the absorbance at 1554 cm$^{-1}$ was used to determine percent of monomer A by means of a calibration curve established with several standard mixtures of commercially available Teflon®-PFA340 and monomer A). Co-monomer PPVE content was measured to be 1.9 weight % of polymer solid by FTIR similar to the method disclosed in U.S. Pat. No. 4,743,658. A cold press rather than a hot press was used.

Example 9

Preparation of TFE/VF2/PMVE/A Polymer

The polymer was prepared by a semi-batch emulsion polymerization process, carried out at 80° C. in a well-stirred reaction vessel. First, a 4-liter stainless steel reactor was charged with deionized, deoxygenated water (2,486 grams), Capstone™ FS-10 (10.8 grams), sodium phosphate dibasic heptahydrate (3 grams), and monomer A (135 grams). The reactor was heated to 80° C. and then pressurized to 300 psig with a combination of vinylidene fluoride (VF2, 43 wt %), perfluoro(methyl vinyl ether) (PMVE, 54 wt %), and tetrafluoroethylene (TFE, 3 wt %). A 10 ml aliquot of an aqueous initiator solution (4.0 wt. % ammonium persulfate and 9.6 wt. % sodium phosphate dibasic heptahydrate) was then added to start the polymerization. A monomer mixture (55 wt % VF2, 35 wt % PMVE, and 10 wt % TFE) was supplied to the reactor to maintain a pressure of 300 psig throughout the polymerization. After a total of 833 g of monomer mixture was supplied to the reactor, monomer addition was discontinued and the reactor was purged of residual monomer by sweeping with nitrogen gas at ambient temperature. The total reaction time was 90 minutes. The resulting fluoroelastomer latex was coagulated by addition of an aqueous magnesium sulfate solution. The fluoroelastomer was washed with deionized water to yield a polymer crumb that was dried for two days at 60° C. A white polymer (960 grams) was obtained. This polymer was analyzed by $^{1}$H-NMR and $^{19}$F-NMR and the composition was determined to be VF2/PMVE/TFE/A=67.6/23.3/8.5/0.64 mole %. This polymer exhibited a glass transition temperature (Tg) at −31.9° C., as measured by DSC.

Example 10

Preparation of VF2/HFP/TFE/A Polymer

The polymer was prepared by a semi-batch emulsion polymerization process, carried out at 80° C. in a well-stirred reaction vessel. A 4-liter stainless steel reactor was charged with deionized, deoxygenated water (2,486 g), Capstone™ FS-10 (10.8 g), sodium phosphate dibasic heptahydrate (3 g), and monomer A (135 g). The reactor was heated to 80° C. and then pressurized to 300 psig with a combination of 4 wt % vinylidene fluoride (VF2), 86 wt % hexafluoropropylene (HFP), and 10 wt % tetrafluoroethylene (TFE). An aqueous initiator solution (28.5 ml; 4.0 wt % ammonium persulfate and 9.6 wt % sodium phosphate dibasic heptahydrate) was then added to start the polymerization. A monomer mixture (35 wt % VF2, 37 wt % HFP, and 28 wt % TFE) was supplied to the reactor and a pressure of 300 psig was maintained throughout the polymerization. After a total of 833 g of monomer mixture was supplied to the reactor, monomer addition was discontinued and the reactor was purged of residual monomer by sweeping with nitrogen at ambient temperature. The total reaction time was 140 minutes. The resulting fluoroelastomer latex was coagulated by addition of an aqueous magnesium sulfate solution, and the fluoroelastomer was washed with deionized water. The polymer crumb thus obtained was dried for two days at 60° C. The resulting fluoroelastomer exhibited a glass transition temperature (Tg) of −3.1° C., as measured by DSC.

Example 11

Preparation of TFE/PMVE/A Terpolymer

Deionized, de-aerated water (2,382 grams) and an aqueous perfluoroionomer dispersion (18 grams, 20 wt % solids content) were charged to a four-liter, stainless steel reactor. The reactor was flushed with nitrogen to remove oxygen from the headspace and then heated to 80° C. The reactor was pressurized to 2.14 MPag with a mixture of 25.0 wt % tetrafluoroethylene (TFE) and 75.0 wt % perfluoro-(methyl vinyl ether) (PMVE). Monomer A (10 mL) was fed to the reactor with agitation. Upon introduction of monomer A, the reactor pressure dropped to 2.07 MPa. Fifteen minutes later, an aqueous initiator solution (10 ml; 5% ammonium persulfate and 10% diammonium phosphate) was charged to the reactor. The reactor pressure was maintained at 2.07 MPag by feeding a mixture of 50 weight percent tetrafluoroethylene (TFE) and 50 weight percent perfluoro(methyl vinyl ether) (PMVE) to the reactor. Four additional 10-ml portions of monomer A were charged to the reactor, one portion at a time, alternatively with 75-gram portions of the 50/50 monomer mixture. More specifically, the 10-ml portions of monomer A were charged to the reactor after a total of 75, 150, 225, and 300 grams of the 50/50 monomer mixture had been fed. After 600 grams of the 50/50 monomer mixture had been fed, the reaction was stopped by depressurizing the reactor. A latex (3,084 grams, 19.44 wt % solids) was collected. An aliquot (1000 grams) of the latex was dripped into a hydrochloric acid solution (2.8 wt %; 1,840 grams) to coagulate the latex, then the resulting precipitate was filtered and washed four times, each time with a new portion (1,000 grams) of deionized water. After drying the precipitated polymer at 70° C. for 24 h, it was analyzed by $^{19}$F-NMR and its composition was determined to be TFE/PMVE/A=62.6/36.5/0.7 (mole %).

Example 12

Preparation of TFE/PMVE/A Terpolymer

Deionized, de-aerated water (2,394 grams) and a perfluoroionomer dispersion (6 grams, 20 wt % solids content) were charged to a four-liter stainless steel reactor. The reactor was flushed with nitrogen to remove oxygen from the headspace and then heated to 80° C. The reactor was pressurized to 1.45 MPag with a mixture of 25.0 wt % tetrafluoroethylene (TFE) and 75.0 wt % perfluoro(methyl vinyl ether) (PMVE). Monomer A (19 mL) was fed into the reactor with agitation. Upon introduction of monomer A, the reactor pressure dropped to 1.38 MPag. Fifteen minutes later, an aqueous initiator solution (10 ml; 5% ammonium persulfate and 10% diammonium phosphate) was charged to the reactor. The reactor pressure was maintained at 1.38 MPag by feeding a mixture of 50 wt % tetrafluoroethylene (TFE) and 50 wt % perfluoro(methyl vinyl ether) (PMVE) to the reactor. After 600 grams of the 50/50 monomer mixture had been fed, the reaction was stopped by depressurizing the reactor. A latex (3,006 grams, 19.34 wt % solids) was collected. An aliquot (500 grams) of the latex was dripped into a hydrochloric acid solution (720 grams; 3.6 wt %). The resulting coagulated polymer was collected and washed four times, each time with a new portion (800 grams) of deionized water. After drying the coagulated polymer at 70° C. for 24 h, a rubbery polymer was obtained. Its composition was 53.2 wt % TFE and 46.8 wt % PMVE, as determined by IR analysis.

Example 13

Preparation of TFE/PMVE/8-CNVE/A Polymer

Deionized, de-aerated water (2,394 grams) and a perfluoroionomer dispersion (6 grams, 20 wt % solids) were charged to a four-liter stainless steel reactor. The reactor was flushed with nitrogen to remove oxygen from the headspace and then heated to 80° C. The reactor was pressurized to 2.14 MPag with a mixture of 20.0 wt % tetrafluoroethylene (TFE) and 80.0 wt % perfluoro(methyl vinyl ether) (PMVE). A liquid mixture of monomer A (19 mL) and 8-CNVE monomer (12 mL) was fed to the reactor with agitation. Upon introduction of these liquids, the reactor pressure dropped to 2.07 MPag. Fifteen minutes later, an aqueous initiator solution (10 ml; 5% ammonium persulfate and 10% diammonium phosphate) was charged to the reactor. The reactor pressure was maintained at 2.07 MPag by feeding a mixture of 50 wt % tetrafluoroethylene (TFE) and 50 wt % perfluoro(methyl vinyl ether) (PMVE) to the reactor. After 600 grams of the 50/50 monomer mixture had been fed, the reaction was stopped by depressurizing the reactor. A latex (3,069 grams, 19.18 wt % solids) was collected. The latex was dripped into a hydrochloric acid solution (4,420 grams; 3.5 wt %). The resulting coagulated polymer was collected and washed four times, each time with a new portion (5,000 grams) of deionized water. After drying the coagulated polymer at 70° C. for 24 h, a rubbery polymer was obtained and analyzed by $^{19}$F-NMR spectroscopy. Its composition was determined to be TFE/PMVE/8-CNVE=63.6/35.6/0.8 (mole %) and a small amount of unreacted monomer A. This polymer exhibited a glass transition temperature (Tg) of −4.6° C., as determined by DSC.

Example 14

Preparation of TFE/TFP/A Terpolymer

Deionized, de-aerated water (2,394 grams) and a perfluoroionomer dispersion (6 grams, 20 wt % solids) were charged to a four-liter stainless steel reactor. The reactor was flushed with nitrogen to remove oxygen from the headspace and then heated to 80° C. The reactor was pressurized to 2.07 MPag with a mixture of 97.0 wt % tetrafluoroethylene (TFE) and 3.0 wt % 3,3,3-trifluoropropylene (TFP). Monomer A (19 mL) was fed to the reactor with agitation. Fifteen minutes later, an aqueous initiator solution (5 ml; 5% ammonium persulfate and 10% diammonium phosphate) was charged to the reactor. The reactor pressure was maintained at 2.07 MPag by feeding a mixture of 85 wt % tetrafluoroethylene (TFE) and 15 wt % 3,3,3-trifluoropropylene (TFP) to the reactor. After 600 grams of the 85/15 monomer mixture had been fed, the reaction was stopped by depressurizing the reactor. A latex (2,803 grams; 15.81 wt % solids) was collected. This latex was precipitated, washed with deionized water, and dried at 70° C. for 24 h to afford a white polymer.

Example 15

Preparation of TFE/PMVE/8-CNVE/A Polymer

Deionized, de-aerated water (2,382 grams) and a perfluoroionomer dispersion (18 grams, 20 wt % solids) were charged to a four-liter, stainless steel reactor. The reactor was flushed with nitrogen to remove oxygen from the headspace and then heated to 80° C. The reactor was pressurized to 2.14 MPag with a mixture of 25.0 wt % tetrafluoroethylene (TFE) and 75.0 wt % perfluoro(methyl vinyl ether) (PMVE). A mixed liquid of monomer A (10 mL) and 12.0 milliliters 8-CNVE (12 mL) was fed to the reactor with agitation. Upon introduction of these liquids, the reactor pressure dropped to 2.07 MPag. Fifteen minutes later, an aqueous initiator solution (10 ml; 5% ammonium persulfate and 10% diammonium phosphate) was charged to the reactor. The reactor pressure was maintained at 2.07 MPag by feeding a mixture of 50 wt % tetrafluoroethylene (TFE) and 50 wt % perfluoro(methyl vinyl ether) (PMVE) to the reactor. Four portions of neat monomer A (10 mL) were charged to the reactor, one portion at a time, alternatively with 75-gram portions of the 50/50 monomer mixture. More specifically, the 10-ml portions of monomer A were charged to the reactor after a total of 75, 150, 225, and 300 grams of the 50/50 monomer mixture had been fed. After 600 grams of the 50/50 monomer mixture had been fed, the reaction was stopped by depressurizing the reactor. A latex (3,152 grams; 20.53 wt % solids) was collected. The latex was dripped into a hydrochloric acid solution (4,420 grams; 3.5 wt %). The resulting coagulated polymer was collected and washed four times, each time with a new portion (5,000 grams) of deionized water. After drying, a rubbery polymer (635 grams) was obtained. Its composition was determined by IR analysis (49.6 wt % TFE, 48.4 wt % PMVE, and 2.0 wt % 8-CNVE). This polymer also contained a small amount of unreacted monomer A.

Example 16

Analysis of Example 14

IR spectroscopy of the dried latex obtained in Example 14 reveals the presence of triazine rings and perfluorovinyl groups; no nitrile groups are detected. In addition, $^{19}$F-NMR spectroscopy reveals the presence of perfluorovinyl groups.

Comparative Example 17

Prior Art Process

A copolymer of TFE, TPE and 8-CNVE is synthesized and cured according to processes known in the art. IR spectroscopy reveals the presence of triazine rings and nitrile groups; no perfluorovinyl groups are detected. Nor does $^{19}$F-NMR spectroscopy detect the presence of perfluorovinyl groups.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A copolymer comprising copolymerized units of a perfluorotrivinyltriazine monomer of formula (1):

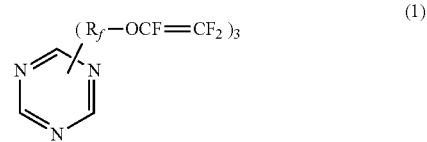

(1)

wherein the three $R_f$ groups are the same or different, and wherein the three $R_f$ groups are selected from the group consisting of —$(CF_2)_n$—, wherein 1≤n≤6;
—$(CF_2)_m$—[$OCF(CF_3)CF_2$]$_p$—, wherein 1≤m≤4 and 1≤p≤4; and
—[$(CF(CF_3)$—$O)_x$—$(CF_2)_k$]—, wherein 1≤x≤3 and 1≤n≤6; and
further comprising copolymerized units of one or more one or more cure-site monomers selected from the group consisting of bromotetrafluoro-1-butene (BTFB); iodotetrafluoro-1-butene (ITFB);
and 1,1,2,2-tetrafluoro-2-((1,1,1,2,3,3-hexafluoro-3-((1,2,2-trifluorovinyl)oxy) propan-2-yl)oxy)ethane-1-sulfonyl azide (8-SAVE); said copolymer comprising no unreacted nitrile groups or a quantity of unreacted nitrile groups that is not detectable by infrared spectroscopy.

2. The copolymer of claim 1, further comprising copolymerized units of one or more comonomers selected from the group consisting of tetrafluoroethylene (TFE); vinylidene fluoride (VF2); hexafluoropropylene (HFP); vinyl fluoride (VF); 3-[1[difluoro[(trifluoroethenyl)oxy]methyl]-1,2,2,2-tetrafluoroethoxy]-2,2,3,3-tetrafluoro-, methyl ester (EVE); perfluoro-2-(2-fluorosulfonylethoxy) propyl vinyl ether (PSEPVE); perfluoro-(long chain vinyl ethers); ethylene (E); propylene (P); perfluorobutyl ethylene (PFBE); perfluoro(ethyl vinyl ether) (PEVE); 9,9-dihydro-9-hydroxyperfluoro(3,6-dioxa-5-methyl-1-nonene (EVE-OH); 1-propanol, 3-[1[difluoro[trifluoroethenyl) oxy]methyl]-1,2,2,2-tetrafluoroethoxy]-2,2,3,3-tetrafluoro-, dihydrogen phosphate (EVE-P); 1,3-dioxole, 4,5-difluoro-2,2-bis(trifluoromethyl) (PDD); perfluoro(propyl vinyl ether) (PPVE); perfluoro(methyl vinyl ether) (PMVE); and 2-(difluoromethylene)-4,4,5-trifluoro-5-(trifluoromethyl)-1,3-dioxolane (PMD).

3. The copolymer of claim 2, wherein the one or more comonomers are selected from the group consisting of TFE, HFP, PMVE, PPVE, and VF2.

4. The copolymer of claim 2, selected from the group consisting of dipolymers consisting of copolymerized units of the perfluorotrivinyltriazine monomer (1) with TFE or copolymerized units of the perfluorotrivinyltriazine monomer (1) with VF2; terpolymers consisting of copolymerized units of the perfluorotrivinyltriazine monomer (1) with TFE and HFP, copolymerized units of the perfluorotrivinyltriazine monomer (1) with TFE and VF2, copolymerized units of the perfluorotrivinyltriazine monomer (1) with TFE and PPVE, or copolymerized units of the perfluorotrivinyltriazine monomer (1) with TFE and PMVE; and copolymers of the perfluorotrivinyltriazine monomer (1) with TFE, VF2 and PMVE.

5. The copolymer of claim 1, comprising from about 0.5 wt % to about 25 wt % of copolymerized units of perfluorotrivinyltriazine monomer (1); and, complementarily, from about 99.5 wt % to about 75 wt % of copolymerized units of one or more comonomers, based on the total weight of the comonomer.

6. The copolymer of claim 1, comprising from about from about 1 wt % to about 10 wt % of copolymerized units of perfluorotrivinyltriazine monomer (1); and, complementarily, from about 99 to about 90 wt % of copolymerized units of one or more comonomers, based on the total weight of the comonomer.

7. The copolymer of claim 1, comprising from about 1 wt % to about 5 wt % of copolymerized units of perfluorotrivinyltriazine monomer (1); and, complementarily, from about 99 to about 95 wt % of copolymerized units of one or more comonomers, based on the total weight of the comonomer.

8. A copolymer comprising copolymerized units of a perfluorotrivinyltriazine monomer of formula (1):

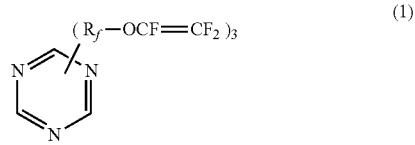

wherein the three $R_f$ groups are the same or different, and wherein the three $R_f$ groups are selected from the group consisting of —$(CF_2)_n$—, wherein $1<n<6$;
—$(CF_2)_m$—$[OCF(CF)CF_2]_p$—, wherein $1 \leq m \leq 4$ and $1 \leq p \leq 4$; and
—$[(CF(CF_3)$—$O)_x$—$(CF_2)_k]$—, wherein $1 \leq x \leq 3$ and $1 \leq k \leq 5$; and
further comprising copolymerized units of one or more one or more cure-site monomers selected from the group consisting of bromotetrafluoro-1-butene (BTFB); iodotetrafluoro-1-butene (ITFB); 3-(1-[difluoro((trifluoroethenyl)oxy)-methyl]-1,2,2,2,-tetrafluoroethoxy)-2,2,3,3,-tetrafluoropropane nitrile (8-CNVE);
and 1,1,2,2-tetrafluoro-2-((1,1,1,2,3,3-hexafluoro-3-((1,2,2-trifluorovinyl)oxy) propan-2-yl)oxy)ethane-1-sulfonyl azide (8-SAVE); said copolymer comprising unreacted pendant perfluorovinyl groups in a finite amount up to 200 mol %, based on the total number of moles of copolymerized residues of the perfluorotrivinyltriazine monomer (1), said unreacted perfluorovinyl groups being pendant from the triazine ring of the perfluorotrivinyltriazine monomer (1).

9. The copolymer of claim 8, comprising unreacted pendant perfluorovinyl groups in an amount of 1 mol % to 199 mol %.

10. The copolymer of claim 8, comprising unreacted pendant perfluorovinyl groups in an amount of 100 mol % to 150 mol %.

11. The copolymer of claim 8, further comprising copolymerized units of one or more comonomers selected from the group consisting of tetrafluoroethylene (TFE); vinylidene fluoride (VF2); hexafluoropropylene (HFP); vinyl fluoride (VF); 3-[1[difluoro[(trifluoroethenyl)oxy]methyl]-1,2,2,2-tetrafluoroethoxy]-2,2,3,3-tetrafluoro-, methyl ester (EVE); perfluoro-2-(2-fluorosulfonylethoxy) propyl vinyl ether (PSEPVE); perfluoro-(long chain vinyl ethers); ethylene (E); propylene (P); perfluorobutyl ethylene (PFBE); perfluoro(ethyl vinyl ether) (PEVE); 9,9-dihydro-9-hydroxyperfluoro(3,6-dioxa-5-methyl-1-nonene (EVE-OH); 1-propanol, 3-[1 [difluoro[trifluoroethenyl) oxy] methyl]-1,2,2,2-tetrafluoroethoxy]-2,2,3,3-tetrafluoro-, dihydrogen phosphate (EVE-P); 1,3-dioxole, 4,5-difluoro-2,2-bis(trifluoromethyl) (PDD); perfluoro(propyl vinyl ether) (PPVE); perfluoro(methyl vinyl ether) (PMVE); and 2-(difluoromethylene)-4,4,5-trifluoro-5-(trifluoromethyl)-1, 3-dioxolane (PMD).

12. The copolymer of claim 11, wherein the one or more comonomers are selected from the group consisting of TFE, HFP, PMVE, PPVE, and VF2.

13. The copolymer of claim 11, selected from the group consisting of dipolymers consisting of copolymerized units of the perfluorotrivinyltriazine monomer (1) with TFE or copolymerized units of the perfluorotrivinyltriazine monomer (1) with VF2; terpolymers consisting of copolymerized units of the perfluorotrivinyltriazine monomer (1) with TFE and HFP, copolymerized units of the perfluorotrivinyltriazine monomer (1) with TFE and VF2, copolymerized units of the perfluorotrivinyltriazine monomer (1) with TFE and PPVE, or copolymerized units of the perfluorotrivinyltriazine monomer (1) with TFE and PMVE; and copolymers of the perfluorotrivinyltriazine monomer (1) with TFE, VF2 and PMVE.

14. The copolymer of claim 8, comprising from about 0.5 wt % to about 25 wt % of copolymerized units of perfluorotrivinyltriazine monomer (1); and, complementarily, from about 99.5 wt % to about 75 wt % of copolymerized units of one or more comonomers, based on the total weight of the comonomer.

15. The copolymer of claim 8, comprising from about from about 1 wt % to about 10 wt % of copolymerized units of perfluorotrivinyltriazine monomer (1); and, complementarily, from about 99 to about 90 wt % of copolymerized units of one or more comonomers, based on the total weight of the comonomer.

16. The copolymer of claim 8, comprising from about 1 wt % to about 5 wt % of copolymerized units of perfluorotrivinyltriazine monomer (1); and, complementarily, from about 99 to about 95 wt % of copolymerized units of one or more comonomers, based on the total weight of the comonomer.

17. A process for producing a cross-linked fluoroelastomer, said process comprising the steps of:
a) providing a perfluorotrivinyltriazine monomer of formula (1):

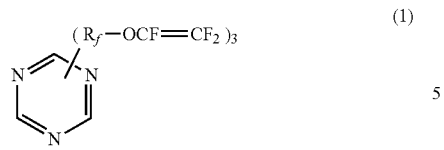

(1)

wherein the three $R_f$ groups are the same or different, and wherein the three $R_f$ groups are selected from the group consisting of $-(CF_2)_n-$ (n=1-6); $-(CF_2)_m-[OCF(CF_3)CF_2]_p-$ (m=1-4, p=1-4); and $[(CF(CF_3)-O)_x-(CF_2)_k]-$, wherein $1 \leq x \leq 3$ and $1 \leq k \leq 5$;

b) providing one or more other comonomers;

c) providing one or more one or more cure-site monomers selected from the group consisting of bromotetrafluoro-1-butene (BTFB); iodotetrafluoro-1-butene (ITFB); 3-(1-[difluoro((trifluoroethenyl)oxy)-methyl]-1,2,2,2,-tetrafluoroethoxy)-2,2,3,3,-tetrafluoropropane nitrile (8-CNVE); and 1,1,2,2-tetrafluoro-2-((1,1,1,2,3,3-hexafluoro-3-((1,2,2-trifluorovinyl)oxy) propan-2-yl)oxy)ethane-1-sulfonyl azide (8-SAVE); and d) reacting the perfluorotrivinyltriazine monomer of formula (1) with the one or more cure site monomers and with the one or more other comonomers to obtain the cross-linked fluoroelastomer.

18. A cross-linked fluoroelastomer that is the product of the process of claim 17.

\* \* \* \* \*